UNITED STATES PATENT OFFICE.

HORACE TRUMBULL, OF JERSEY CITY, NEW JERSEY.

IMPROVEMENT IN THE MANUFACTURE OF GLASS.

Specification forming part of Letters Patent No. 29,020, dated July 3, 1860.

*To all whom it may concern:*

Be it known that I, HORACE TRUMBULL, of Jersey City, in the county of Hudson and State of New Jersey, have invented a new and Improved Composition of Matter to be used in the Manufacture of Flint-Glass; and I hereby declare the following to be a full and sufficient description thereof.

The art of glass-making, up to the time of my invention, embraced, in the manufacture of flint-glass, the following principal ingredients, namely: sand, oxide of lead, alkali, and oxide of manganese. Besides these, there are several minor ingredients used for special purposes, as oxide of arsenic, oxide of tin, niter, borax, &c.

The oxide of lead used may be litharge or red lead, or both mixed. The alkali may be soda or potash. The former is cheaper. The latter is better, because it makes a whiter glass; but the glass of soda is always inclined to green or yellow or bluish tint, and is much more difficult to clean, and is quite perceptible and objectionable in the thick articles usually made of crystal, while potash, under the same circumstances, gives a whiter glass and clearer, so that the thickness necessary for fine cut work causes no objection on account of color; but I have found by experiment many times repeated that the use of soda even is not so objectionable in the finest flint-glass if zinc oxide be substituted for lead oxide, as in this case the glass becomes almost entirely free from color-vein, and striæ.

My invention therefore consists in making a new composition for the manufacture of flint-glass, in which the usual ingredient—oxide of lead—is replaced by the oxide of zinc. It is not alleged that zinc oxide has not been fused with other ingredients to form a glass, but that it has never been used to replace lead oxide in flint-glass.

The oxides of lead make valuable and powerful fluxes, favorable to forming fluid glass, flowing freely, and when well dosed with oxide of manganese are made tolerably free from color. Still, obtaining a clear and brilliant white cannot be depended on from the use of manganese and lead oxide, for in lead glass, especially where the alkali is soda, the native green or yellow tint is removed by the oxide of manganese. If this last be in excess, the predominating tint is red; if it be too little to neutralize the composition, the tint is yellow, green, or blue. The chief difficulty in managing the proportions is that with the same relative proportions of manganese we do not always get the same tint of color, from the fact that the same weight of alkali does not always have the same real amount of alkali in it, and consequently has not the same neutralizing-power; but the use of zinc oxide for lead oxide relieves considerably the uncertainty of the neutralizing action, so we obtain an approximation to a uniformity of tint not hitherto attained by the use of leads. Another quality of glass arising from the use of zinc oxide in place of lead is that the specific gravity of the mixture is less than when lead oxide is used, thus diminishing the tendency of the oxide to gravitate toward the bottom of the crucible or pot, and therefore diminishing the necessity of frequent stirring to keep up a uniformity of mixture. It is also to be remembered that the process of stirring, from its imperfection in attaining the desired result, leaves the metal of the pot in veins and striæ, which shows itself in the glass manufactured.

The flint-glass made by the substitution of the zinc oxide for lead oxide is free from the defects above named.

Another valuable quality in the zinc-oxide glass is that it is harder and receives a higher polish than lead glass. Besides this, the zinc oxide costs several cents in the pound less than the lead oxide.

The composition which I prefer to use in my flint-glass, although some variation is allowable to adapt the zinc oxide to the greater or less purity of the other ingredients without varying from the principle of the improvement, is as follows: pure white sand, six parts; oxide of zinc, four parts; soda, two parts; arsenic, two parts; oxide of manganese, fourteen parts.

Having now described the proportions and characters of my composition for the manufacture of flint-glass, I would remark that I do not claim to be the first to have used zinc oxide to mix with other materials to form a glass; but

What I claim as my invention, and desire to secure by Letters Patent, is—

The substitution of oxide of zinc for the oxide of lead in the composition of ordinary flint-glass, substantially in the manner and for the purpose herein fully set forth.

HORACE TRUMBULL. [L. S.]

Witnesses:
G. H. S. MEHORE,
G. N. SAVAGE.